April 24, 1962 W. E. FRADY 3,031,585

GATING CIRCUITS FOR ELECTRONIC COMPUTERS

Filed Nov. 1, 1956 2 Sheets-Sheet 1

WILLIAM ENSIGN FRADY
INVENTOR.

BY ELWOOD S. KENDRICK

ATTORNEYS

GATING CIRCUITS FOR ELECTRONIC COMPUTERS

Filed Nov. 1, 1956

2 Sheets-Sheet 2

WILLIAM ENSIGN FRADY
INVENTOR.

BY ELWOOD S. KENDRICK
Lester S. Hecht
ATTORNEYS 3,031,585

GATING CIRCUITS FOR ELECTRONIC COMPUTERS

William Ensign Frady, Palos Verdes Estates, Calif., assignor, by mesne assignments, to Thompson Ramo Wooldridge Inc., Cleveland, Ohio, a corporation of Ohio Filed Nov. 1, 1956, Ser. No. 619,828
7 Claims. (Cl. 307—88.5)

This invention relates to gating circuits for electronic computers and, more particularly, to gating circuits which may be employed to translate the relatively constant output signals of a two-state device into pulses representing the state thereof.

The circuits provided by the present invention have particular application in computing systems where input signals must be provided for flip-flops or other storage devices in accordance with predetermined logical equations.

The problem of providing pulse input signals for flip-flops in accordance with predetermined logical functions has been approached in various ways in the prior art. In the early development of the art, pulse-coincidence gating was employed where the logical state of the various flip-flops in a system was indicated by the presence or absence of a pulse or perhaps by pulses of different polarity. In a system of this type, the "and" function is accomplished by employing output signal pulses of relatively long time duration and synchronizing pulses of a shorter duration. These pulses then are applied to the pulse-coincidence circuit. Any output signal which results is then presented to a shaping circuit which is operative to cause a standard output pulse to be generated when all of the input pulses to the "and" coincidence gate are of the proper polarity and amplitude.

While pulse gating circuits of this type have been operated satisfactorily and are still employed to some extent, the necessity of providing correct timing and pulse shaping throughout the system is frequently found to be a prohibitive limitation. This is especially so where reliability in terms of accuracy, to perhaps one part in one billion, is required. Furthermore, even where this extreme reliability is not required, the pulse timing and shaping equipment generally means a substantial increase in circuit cost and complexity.

Pulse-coincidence circuits of this type may be found as a matter of background interest in considering the present specification in an article entitled "Diode Coincidence and Mixing Circuits in Digital Computers" by Tung Chang Chen, in volume 38 of Proceedings of the Institute of Radio Engineers on pages 511–514; and in U.S. Patent No. 2,712,065 by R. D. Elbourn et al., entitled "Gating Circuitry for Electronic Computers" issued June 28, 1955.

Perhaps the major deficiency of the pulse-coincidence technique arises from the necessity of employing "negation" or "not" circuits. A typical example of this type of circuit is shown in FIG. 2 of the above-mentioned Elbourn patent where positive pulses are applied to two input terminals of the gating circuit and a negative inhibiting signal is applied to the third input terminal. This gating circuit cannot operate properly, then, unless both positive and negative signals occur in pulse coincidence.

In view of the various limitations of the pulse gating technique discussed above, another approach has been frequently adopted and may be referred to as D.-C. gating. In systems of this type, the bilevel output signals of the various flip-flops are utilized directly and are not converted to pulses. The system logic then is generated as a function of various D.-C. input signals, the logical D.-C. voltage levels being pulled up at various points through gating resistors. A system of this type is found, for example, in the disclosure of the patent to Wolfe No. 2,644,887.

One of the major disadvantages of the conventional D.-C. gating systems, such as is shown in the Wolfe patent, is that power must be continuously supplied to the gating circuits from the various information sources or flip-flops. A further limitation is that the gating takes place at a different D.-C. voltage level than the voltage level which must be supplied to the flip-flop circuits in order to change their stable state. This means that it is necessary to A.-C. couple the gated information into the flip-flops so that some sort of capacitive coupling circuit is specified.

The gating circuit thus must supply enough energy in a given amount of time to charge the capacitor at the maximum repetition rate that the system is required to operate. In addition, the capacitor must be discharged rapidly enough to enable the majority of the D.-C. voltage swings at the flip-flop circuit side of the capacitor to be available.

The net result in the D.-C. gating system is that the diode gate resistors must be small enough, considering the value of the capacitor used, in order to ensure the proper time constant for the clock pulse rate; but as these gate resistors are decreased in size, the current and power requirements go up. This has meant that the D.-C. gating system has been limited in its maximum frequency of operation for a given load condition.

Another limitation placed upon the maximum value of the gating resistors employed in the D.-C. gating system is determined by the useful back resistance of the diodes which are used. If this diode back resistance is low and the gating resistor is high, the back current through a number of diodes may cause an erroneous output signal.

The advantages of both the D.-C. level and pulse coincidence gating circuits are realized in the gating circuits described in copending U.S. application for "Input Circuits and Matrices Employing Zener Diodes as Voltage Breakdown Gating Elements," Serial No. 522,242 filed July 15, 1955, by Cravens L. Wanlass, now Patent No. 2,965,767 granted December 20, 1960. In this application, an improved arrangement of what may be referred to as a D.-C. pulse gating is achieved by employing voltage breakdown devices, which may be Zener diodes, to effect a voltage-to-current transformation.

The basic concepts introduced in the Wanlass disclosure just mentioned, will be considered at various points throughout this specification and, accordingly, are hereby incorporated by reference into the present description.

The Wanlass system, however, has certain inherent limitations which are overcome by the present invention. The technique therein requires that a fair amount of power be provided by the devices providing the D.-C. control signals. The reason for this is that the output circuit of the control device is directly coupled to the gating impedance to which the clock pulse for the gating system is applied. As a result, an output storage capacitor is generally required to provide the required power in a typical gating situation for a reasonably high clock pulse frequency.

The present invention contemplates further improvements in the D.-C. pulse gating field whereby the load requirement of the devices providing the control signals for the gating circuits is substantially reduced. In accordance with the basic concept of the present invention, a switching device is employed having an input circuit for receiving the control signal and a current-conduction path connected in series with a gating impedance. Pulses are applied across the gating impedance and the current-conduction path of the switching device. A load is coupled to the junction of the switching device and the gating impedance and receives actuating or substantial power when the current switch is back biased to assume a very high impedance as compared to the load impedance, thus preventing the shunting of current through the switching device. In this manner an input or control signal occupying a predetermined one of two distinct voltage levels controls the high impedance condition of the switching device with resulting power transfer and the other voltage level is selected to forward bias the switching device and cause the current-conducting path to assume a very low impedance.

While it is important that an impedance appears in series with the current-conduction path of the switch employed in the invention, it will be understood that such an impedance may form part of the pulse supply. Therefore, a high impedance or constant current pulse source may be employed in the place of separate gating impedances, although the separate gating impedances may provide better circuit isolation.

The improvement in power-supplying capability through the utilization of switches in accordance with the concept of the present invention becomes evident when it is considered that the number of load circuits which may be supplied with actuating power is not determined by the amount of power supplied by the devices providing the control signals. The determining factor as to the number of loads which may be supplied power is a function of a comparison between the high and low impedances of the switch current-conduction paths and the total load impedance.

For the invention to operate properly, the load circuit impedance must be relatively low in comparison to the very high impedance of the switch current-conduction path when it is back biased by the applied control signal and the total load impedance must be very high in comparison to the relatively low impedance of the current-conduction path of the switch when it is forward biased.

The invention may be practiced with either transistors or vacuum tubes as typical switching devices. When transistors are employed, the collector-to-emitter path constitutes the current-conduction path which is controlled through the base electrode of the transistor. If NPN transistors are employed as switches, positive clock pulses are applied across the series combination of the gating resistor and the associated collector-emitter path; whereas if PNP transistors are employed, negative clock pulses are applied in the same manner. When vacuum tubes are employed, positive clock pulses are applied through the gating impedance, which may form part of the clock pulse source, to the anode of the vacuum tube, the cathode being in the current-conduction path. The grid of the vacuum tube, then, receives the applied control signal.

In utilizing the present invention in a logical switching network, the output signals of each logical element, such as a flip-flop, which is to be employed in the network, are applied to a switch of the type mentioned above. In an "or" circuit employing the invention, each gating-impedance-to-switch-junction point is coupled through a buffer unilateral device, such as a diode, to the load. When NPN transistors are employed, this means that the application of a low level control signal to any of the NPN switches in the "or" circuit allows the passage of a positive clock pulse current signal through the associated buffer unilateral device to the load. The unilateral devices are required in order to prevent other switches in the "or" circuit from shunting the output current.

The voltage breakdown technique of the above-mentioned Wanlass application, Serial No. 522,242, may be employed in the "or" circuit just described, whereby the buffer unilateral devices may be Zener diodes. Other arrangements will also be illustrated where this technique is employed advantageously.

The invention may also be utilized in an "and" circuit where no unilateral devices are required for buffer action, provided that the flip-flops involved are not otherwise loaded. In this case, then, considering the situation where NPN transistors are employed, the collector electrodes are coupled together and to the gating impedance. Output pulse power is not available to a load unless both of the control input signals are at a lower level, back biasing the associated NPN transistor. It is only in this case, that the "and" condition is satisfied. Otherwise, one of the transistors is forward biased and shunts the clock pulse power away from the load.

Since germanium transistors are available which may have a very low impedance between collector and emitter electrodes, it is apparent that the present invention may be employed to drive a considerable number of loads. In a typical situation, the load may correspond to the base-to-emitter impedance of a transistor which is considerably higher than the collector-to-emitter impedance, so that many such impedances may be driven in parallel before the total load impedance approaches the transistor switch shunt impedance.

Accordingly, it is an object of the present invention to provide an improved D.-C. gating circuit where a reduced amount of load is placed upon the control signal providing source.

Another object of the invention is to provide an improved gating circuit which is especially well adapted for transistor circuits where it is necessary to minimize the amount of control signal power required.

A further object of the invention is to provide an improved D.-C. pulse gating circuit being actuable at a higher pulse frequency for relatively large current loads than theretofore possible due to the utilization of a low impedance switch as a buffer between the control devices and the gating circuits.

A more specific object of the invention is to provide an improved gating circuit employing transistors where the collector-emitter current path of the transistor is controlled through the application of a D.-C. signal to the base electrode thereof and a gating impedance is connected in series with the collector-emitter current path, whereby pulse power is shunted through the current path of the transistor for one condition of the control signal, preventing passage thereof to a load, and is passed to the load for the other condition of the control signal when the transistor is back biased.

Another specific object of the invention is to provide an improved "or" circuit wherein a plurality of low impedance switches are employed, one for each of the control signals specified in the corresponding "or" function, each low impedance switch receiving a clock pulse signal through an associated gating impedance, the junction therewith being coupled through respective unilateral devices to an output circuit.

A further specific object of the invention is to provide an improved "and" circuit wherein a plurality of low impedance switches are coupled in common to a gating impedance, the back biasing of all the low impedance switches making output power available to an output circuit and satisfying the "and" condition.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only and are not intended as a definition of the limits of the invention.

Figure 3:
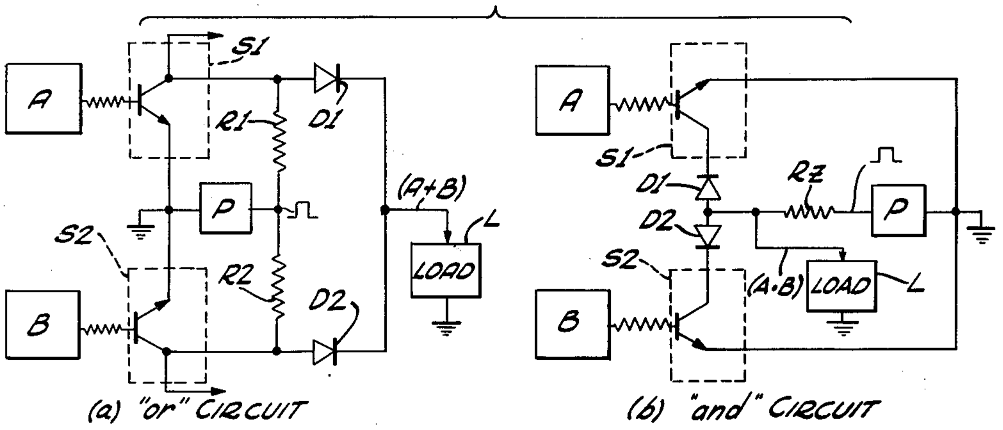
Figure 4:
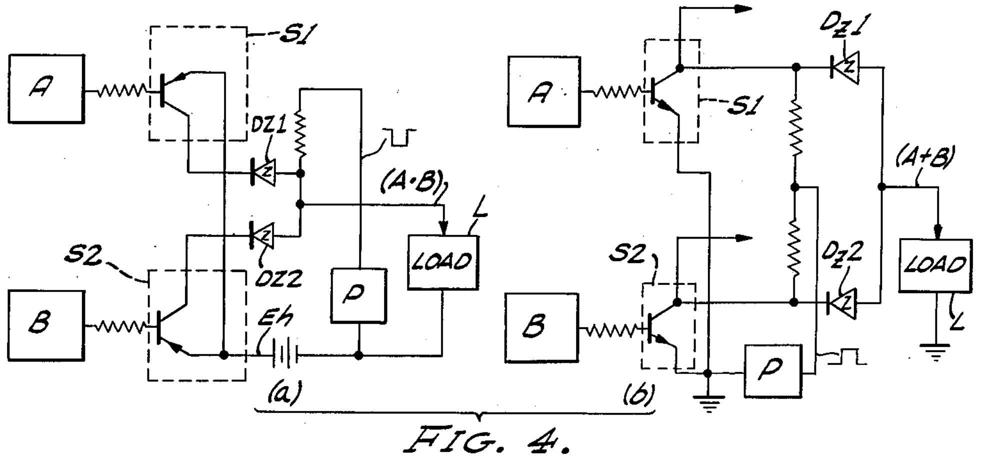
Figure 5:
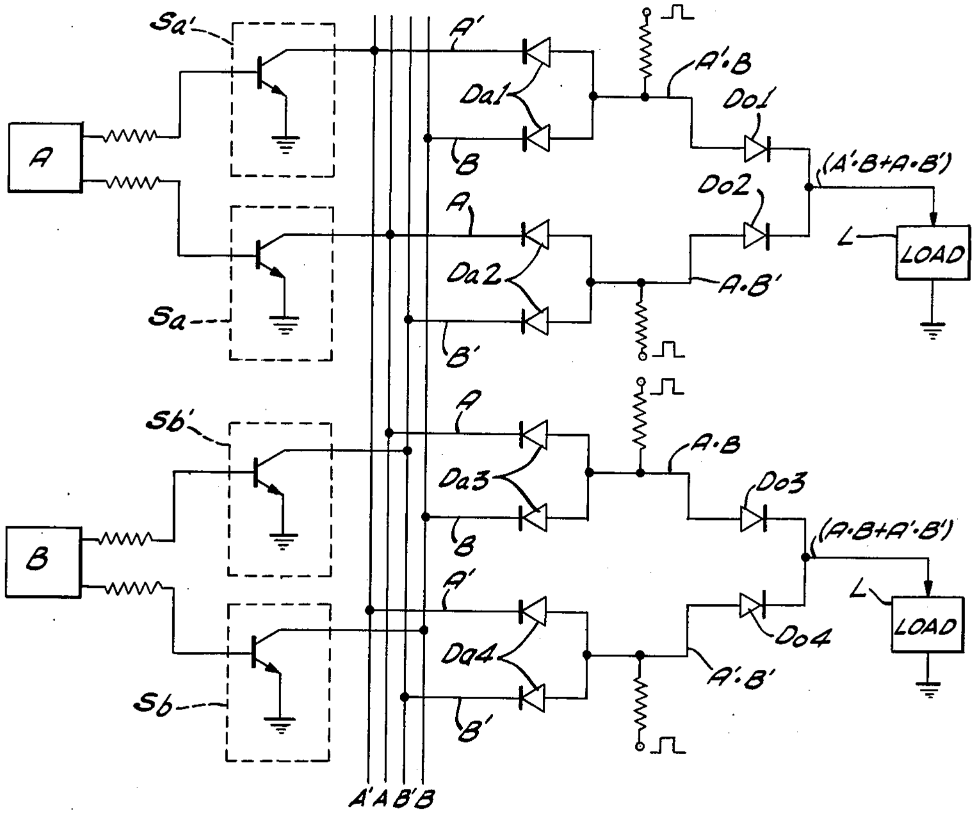

FIGS. 3*a* and 3*b*, respectively, illustrate an "or" circuit and an "and" circuit employing the present invention;

FIG. 4 illustrates another form of "and" circuit and another form of "or" circuit employing Zener diodes as gating elements; and FIG. 5 illustrates a typical logical network employing the present invention.

Figure 1:
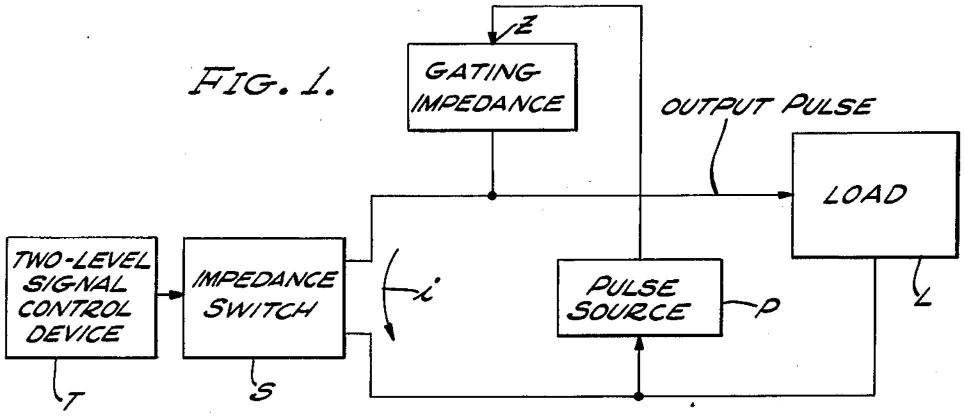
FIG. 1 is a block diagram illustrating the general form of the present invention.

Reference is now made to FIG. 1 wherein it will be noted that a switch S receives a two-level control signal produced by a two-state device T, switch S being connected in current series with a gating impedance Z driven by a pulse source P. The junction of gating impedance Z and switch S provides an output point which is coupled to a current-sensitive load L. When the control signal is at one level, switch S provides a very low-impedance current path for pulse source P preventing the passage of actuating power to the load L, the impedance of load L being then very high in comparison to the low impedance of the current-conduction path of switch S. In this case, the gating condition is not satisfied. On the other hand, when the control signal is at the opposite level, switch S is back biased and assumes a very high impedance. Pulse power from source P, then, passes through gating impedance Z to load L, the impedance of which is then low in comparison to the impedance of the current-conduction path of switch S.

Figure 2:
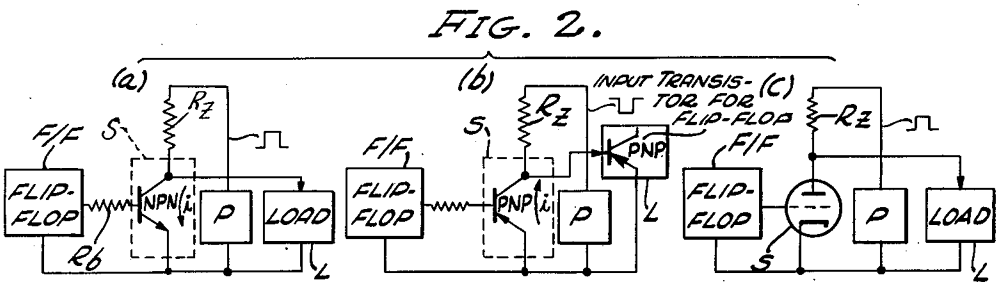
FIG. 2 illustrates two species of the invention employing transistors and one specie employng a vacuum tube.

The basic theory of the invention can best be understood by considering a few specific examples. Reference for this purpose is first made to FIG. 2 wherein three types of gating circuits employing the invention are shown. In particular, in FIG. 2*a*, the low impedance switch is an NPN transistor, and it is assumed that the control signal is derived from a flip-flop F/F. The control signal derived from flip-flop F/F is passed through a buffer impedance R*b* to the base electrode of the NPN transistor constituting switch S. A positive clock pulse source P has one end coupled through a gating resistor R*z* to a current input end of switch S, and the other end of source P is coupled to the current output end of switch S. The flow of current for the forward bias condition of switch S is indicated by the arrow "*i*." The load L is coupled in parallel to switch S as before.

When the control signal produced by flip-flop F/F is in a high level state, switch S is forward biased, and consequently, any current available through load impedance Z is shunted through switch S. Thus no power, or substantially no power, passes to load L which has an impedance substantially greater than the forward impedance of switch S. It will be understood, of course, that the load may be insensitive to the application of any power until it reaches a certain level, such as is the case of a transistor where the input signal is applied to the base electrode thereof, and, consequently, the shunting action of switch S need not be perfect as long as it prevents actuating power from being applied to the load.

A similar arrangement is shown in FIG. 2*b* where switch S includes a PNP transistor. The operation of this circuit is similar to that of FIG. 2*a* except for the change in polarity of the clock pulse signal, which is negative in this case. FIG. 2*b* also illustrates a typical load input circuit where a transistor flip-flop constitutes the load. It will be noted that a PNP transistor is shown as the load which is caused to pass current when a negative pulse is applied to the base thereof.

A third type of basic gating arrangement is shown in FIG. 2*c* where a vacuum tube is employed. In this case the control signal is applied to the grid electrode of the vacuum tube and the bias-controlled current-conduction path of switch S is found in the anode-cathode path of the vacuum tube. When the switch signal is at a low level, the vacuum tube is back biased and clock pulse power may pass through gating resistors R*z* to a current-sensitive load. On the other hand, when the control signal applied to the grid of the tube in switch S is at a high level, the tube is forward biased and provides a low impedance current-conduction path to ground, much in the same manner as a forward biased diode, thus shunting any actuating power away from the load.

In employing the invention in more complicated circuits, each control signal forming part of the gating circuit is associated with a switch S. Thus, in FIG. 3*a*, where an "or" circuit is illustrated, it will be noted that two flip-flops A and B control first and second switches S1 and S2 illustrated typically as NPN transistors having their emitters coupled together and to one end of pulse source P.

The collector electrodes of the transistors receive positive clock pulse signals through associated gating resistors R1 and R2, respectively. The junction points between gating load resistors R1 and R2 and switches S1 and S2 are coupled, respectively, to the anodes of first and second buffer diodes D1 and D2 having their cathodes coupled together and to the load L. The output signal is shown as A+B to illustrate an "or" function. Additional leads are also provided from the collector electrodes in each of the switches S1 and S2 to provide output signals for use in other circuits, for example, in other gating circuits.

FIG. 3*b* shows a form of "and" circuit employing NPN transistors in accordance with the present invention. It is assumed for this illustration that switch circuits S may be otherwise loaded. The requirement of buffer diodes will be better understood when the complete gating system of FIG. 5 is considered below. In FIG. 3*b* the collector electrodes of the switches S1 and S2 are coupled through diodes D1 and D2, respectively, the anodes of the diodes receiving positive clock pulses from source P through impedance R*z*. In this manner the diodes are arranged to be forward biased when the associated switch is forward biased, and clock pulse power is then shunted therethrough to ground and cannot pass to load L. Consequently, it is not until both of the controlling flip-flops A and B are in a state providing a low level control signal that output power is available, satisfying the "and" condition of the gating circuits.

Another pair of logical "and" and "or" circuits is shown in FIG. 4. In FIG. 4*a* the negative "and" circuit of the above-mentioned Wanlass application, Serial No. 522,242, is employed and switches S1 and S2, then are PNP transistors which provide low impedance paths for applying a signal E*h* to first and second Zener diodes D*z*1 and D*z*2. When either of the switches is forward biased, signal E*h* is applied to the corresponding Zener diode causing it to break down and assume a low impedance conducting state which prevents negative clock pulse power from passing to the load. Consequently, the switches S1 and S2 must be back biased before negative clock pulse power may pass to a load.

A battery is shown in FIG. 4*a* coupling source P to the emitters of the transistors constituting switches S1 and S2. This provides the potential E*h* necessary to cause the Zener breakdown of diodes D*z*1 and D*z*2 when the transistors are forward biased.

In FIG. 4*b*, the invention is employed in an "or" circuit where Zener diodes D*z*1 and D*z*2 are employed in accordance with application Serial No. 522,242. Diodes D*z*1 and D*z*2 are selected to have a Zener breakdown characteristic, and are employed in the same manner as they are in FIG. 1*c* of the application, Serial No. 522,242 by C. L. Wanlass mentioned above. The purpose of these Zener diodes is to make the gating circuit highly reliable in discriminating against spurious signal variations in the gating system. The Zener diodes cannot break down until the proper gating voltage is present so that voltage source variations of a smaller magnitude do not create false pulses.

It will be understood, of course, that Zener diodes are not required in the practice of the present invention since a conventional buffer diode arrangement may be employed such as is shown in FIG. 5 to be described below.

A typical network is shown in FIG. 5 where two functions F1 and F2 are shown defined as follows:

$$F1=A.B'+A'.B$$
$$F2=A.B.+A'.B'$$

the dot (.) representing the logical "and", and the plus (+) the logical "or".

It will be noted that four switches *Sa, Sa', Sb,* and *Sb'* having output leads designated as A, A', B, B', respectively, are shown. These leads are connected in accordance with the respective logical functions given above. It will be noted that the "and" diode pairs D*a*1—D*a*4 are included to isolate the switches and allow independent operation. For example, if diode pair D*a*1 were removed, the lines A' and B would be shorted and, consequently, switches *Sa'* and *Sb* would have their output leads connected together. Therefore, if either of these switches was forward biased, it would shunt any signal across the other switch.

From FIG. 5 it may thus be seen that in a complete circuit mechanization both the "and" and the "or" diodes are required, although the voltage breakdown gating technique of the Wanlass application, Serial No. 522,242 may preferably be employed in certain circumstances.

From the foregoing description it is apparent that the present invention provides an improved gating circuit arrangement of the D.-C. pulse type where a low impedance switch provides an effective buffer between the control signal source and the load. As a result, a minimum of load is placed upon the control signal source, and, consequently, the invention constitutes an important contribution in the transistor flip-flop controlled gating applications.

Thus, through the invention, it is possible to do away with a capacitor-charging circuit discussed above and the power-frequency capability of the gating circuits of the present invention is enhanced considerably.

While only a few types of low impedance switches have been described with particularity herein, it will be understood that any device which may be controllable through an input circuit to provide a low impedance current path in series with a gating impedance is suitable. At present the transistor and the vacuum tube are advantageously employed, but the principles involved herein are no means limited to such devices.

What is claimed as new is:

1. In a logical switching network, the combination comprising: a plurality of two-state devices for producing bilevel control signals; a plurality of switches, one for each of said two-state devices, each of said switches having a first electrode for receiving a control signal and having a current-conduction path between a pair of additional electrodes, each of said switches being responsive to one of the two levels of the applied bilevel control signal for causing said current-conduction path to assume a very high impedance, and to the other of said levels for causing said path to assume a very low impedance; a plurality of unilateral devices associated, respectively, with said current-conduction paths; pulse means for applying clock pulse signals across said current-conduction paths in parallel, said pulse means including a series impedance for each of said switches; and means for coupling a load across said switches to pass substantial power to said load when the current-conduction paths in parallel therewith present said very high impedance.

2. The switching network defined in claim 1 wherein each of said switches includes a transistor having collector, base, and emitter electrodes, the base electrode constituting said first electrode for receiving the control signal from the associated two-state device, and the collector-emitter paths of said transistors constituting the current-conduction paths connected in current series with said unilateral devices, said collectors being said second electrodes and said emitters being said third electrodes, said clock pulse being of positive polarity.

3. An electrical "and" circuit comprising, in combination: a plurality of switching devices coupled together in parallel, each of said switching devices being selectively operable to present either a very high impedance or a very low impedance; control means including a two-state device for selectively operating said plurality of switching devices; a plurality of unilateral devices, each unilateral device having a first electrode connected to one side of a respective one of said plurality of switches, and a second electrode connected to a common junction point; a source of pulses coupled to the other sides of said plurality of switches; and a gating impedance connected between said common junction point and said source of pulses, an output pulse being produced at said common junction point only when all of said plurality of switching devices present said very high impedance.

4. An "and" circuit comprising: bistable devices A and B; first and second switches for receiving output signals of said devices A and B representing the states of devices A and B, respectively, each switch having a current-conduction path which presents a high impedance when back biased and a low impedance when forward biased; first and second unilateral devices, each having a first and a second electrode, said first electrodes being coupled to the current-conduction paths of said first and second switches, respectively, said unilateral devices being coupled to the associated switches so as to be forward biased when the associated switch is forward biased; a gating impedance having first and second ends; said unilateral devices being coupled together at said second electrodes and the junction created thereby being coupled to the first end of said gating impedance; and means for impressing clock pulses across the second end of said gating impedance and said current-conduction paths.

5. An "or" circuit comprising: bistable devices A and B to produce bilevel control signals representing their respective states; first and second switches having input terminals connected to the outputs of said bistable devices A and B for receiving bilevel control signals representing the states of devices A and B, respectively, each of said switches having a current-conduction path between first and second output terminals, said switches being responsive to one of the two levels of the applied control signal to assume a very high impedance, and responsive to the other level of the applied control signal to assume a very low impedance; first and second gating impedances having first ends coupled to said first output terminals, respectively; a pulse source coupled between the second ends of said gating impedance and both of said second output terminals; and output means including first and second unidirectional devices coupled to said first output terminals for providing an output signal representing the function A+B.

6. A logical circuit comprising: first and second two-state devices for producing control signals representing their respective states; first and second switches for receiving the control signals of said first and second devices, respectively, each switch having a current-conduction path assuming a very high impedance for one level of the applied control signal and assuming a very low impedance for the other level of said applied control signal; pulse means coupled across the current-conduction paths of said switches, said means including an impedance in series with each current-conduction path; and first and second unilateral devices coupling said switches together to form an output circuit producing a signal representing the predetermined function of the states of said two-state devices.

7. An electrical "or" gating circuit comprising, in combination: at least one bitable device for producing output signals representative of its state; a plurality of switching devices each having a control terminal and a current path operable to present either a very high impedance or a vary low impedance in response to the one of the output signals of said bistable device applied to its control terminal; a plurality of gating impedances respectively coupled to current paths of corresponding ones of said switching devices to provide a plurality of series circuit combinations, all of said plurality of series circuit combinations being connected together in parallel; means for applying a voltage pulse across the parallel grouping of said plurality of series circuit combinations; and output circuit means coupling the junctions of gating impedances and the corresponding current paths of said switching devices and responsive to said voltage pulse for producing an output energy pulse if any one of said switching devices then presents said very high impedance.

References Cited in the file of this patent

UNITED STATES PATENTS

| | | |
|---|---|---|
| 2,293,135 | Hallmark | Aug. 18, 1942 |
| 2,535,377 | Titterton | Dec. 26, 1950 |
| 2,537,843 | Meacham | Jan. 9, 1951 |
| 2,594,449 | Kircher | Apr. 29, 1952 |
| 2,597,796 | Hindall | May 20, 1952 |
| 2,601,096 | Creamer et al. | June 17, 1952 |
| 2,627,039 | MacWilliams | Jan. 27, 1953 |
| 2,663,800 | Herzog | Dec. 22, 1953 |
| 2,651,718 | Levy | Sept. 8, 1953 |
| 2,712,065 | Elbourn | June 28, 1955 |
| 2,730,632 | Curtis | Jan. 10, 1956 |
| 2,785,304 | Bruce et al. | Mar. 12, 1957 |